United States Patent
Cooper

(10) Patent No.: US 8,021,618 B1
(45) Date of Patent: Sep. 20, 2011

(54) FILTER WITH CHANGE INDICATOR

(76) Inventor: Nathan R. Cooper, Galivants Ferry, SC (US)

( * ) Notice: Subject to any disclaimer, the term of this patent is extended or adjusted under 35 U.S.C. 154(b) by 1361 days.

(21) Appl. No.: 11/523,138

(22) Filed: Sep. 19, 2006

(51) Int. Cl.
A62B 7/08 (2006.01)
A61L 9/00 (2006.01)

(52) U.S. Cl. ............ 422/123; 422/120; 422/122; 422/5

(58) Field of Classification Search .................. 422/120, 422/122, 123, 5
See application file for complete search history.

(56) References Cited

U.S. PATENT DOCUMENTS

| | | |
|---|---|---|
| 1,770,094 A | 7/1930 | Wickersham |
| 2,753,831 A | 7/1956 | Davies |
| 3,740,931 A | 6/1973 | Nowicki |
| 4,321,070 A | 3/1982 | Bede |
| 5,325,809 A | 7/1994 | Mulle, Jr. |
| 5,352,255 A | 10/1994 | Taft |
| 5,512,075 A * | 4/1996 | Ninomiya et al. ............. 55/497 |
| 5,546,257 A * | 8/1996 | Jennings ........................ 360/128 |
| 5,547,636 A * | 8/1996 | Vick et al. ...................... 422/124 |
| 5,791,282 A * | 8/1998 | Christ-Janer ..................... 116/5 |
| 6,096,224 A | 8/2000 | Champie |
| 6,110,260 A | 8/2000 | Kubokawa |
| 6,126,707 A * | 10/2000 | Pitzen ............................. 55/495 |
| 6,320,513 B1 | 11/2001 | Timmons, Jr. |
| 6,412,435 B1 | 7/2002 | Timmons, Jr. |
| 6,503,458 B1 * | 1/2003 | Ogle ............................. 422/121 |
| 6,837,922 B2 | 1/2005 | Gorin |
| 6,854,367 B2 * | 2/2005 | Ericksson et al. ............... 82/138 |
| 6,913,733 B2 | 7/2005 | Hardy et al. |
| 7,164,849 B1 * | 1/2007 | Bankers et al. ............... 392/386 |
| 2004/0182055 A1 * | 9/2004 | Wynn ............................ 55/497 |

* cited by examiner

Primary Examiner — Sean E. Conley
Assistant Examiner — Regina Yoo
(74) Attorney, Agent, or Firm — P. Jeff Martin; The Law Firm of P. Jeffrey Martin, LLC

(57) ABSTRACT

A filter change indicator is provided and includes a fragrance and auditory emission apparatus adapted to be installed in disposable-type air filters utilized to remove contaminants carried along in the air stream of HVAC systems. The fragrance and auditory emission apparatus functions to emit a shrill tone or whistling noise when the air filter becomes dirty or clogged. The fragrance and auditory emission apparatus also functions as an air freshener or a room deodorizer.

12 Claims, 3 Drawing Sheets

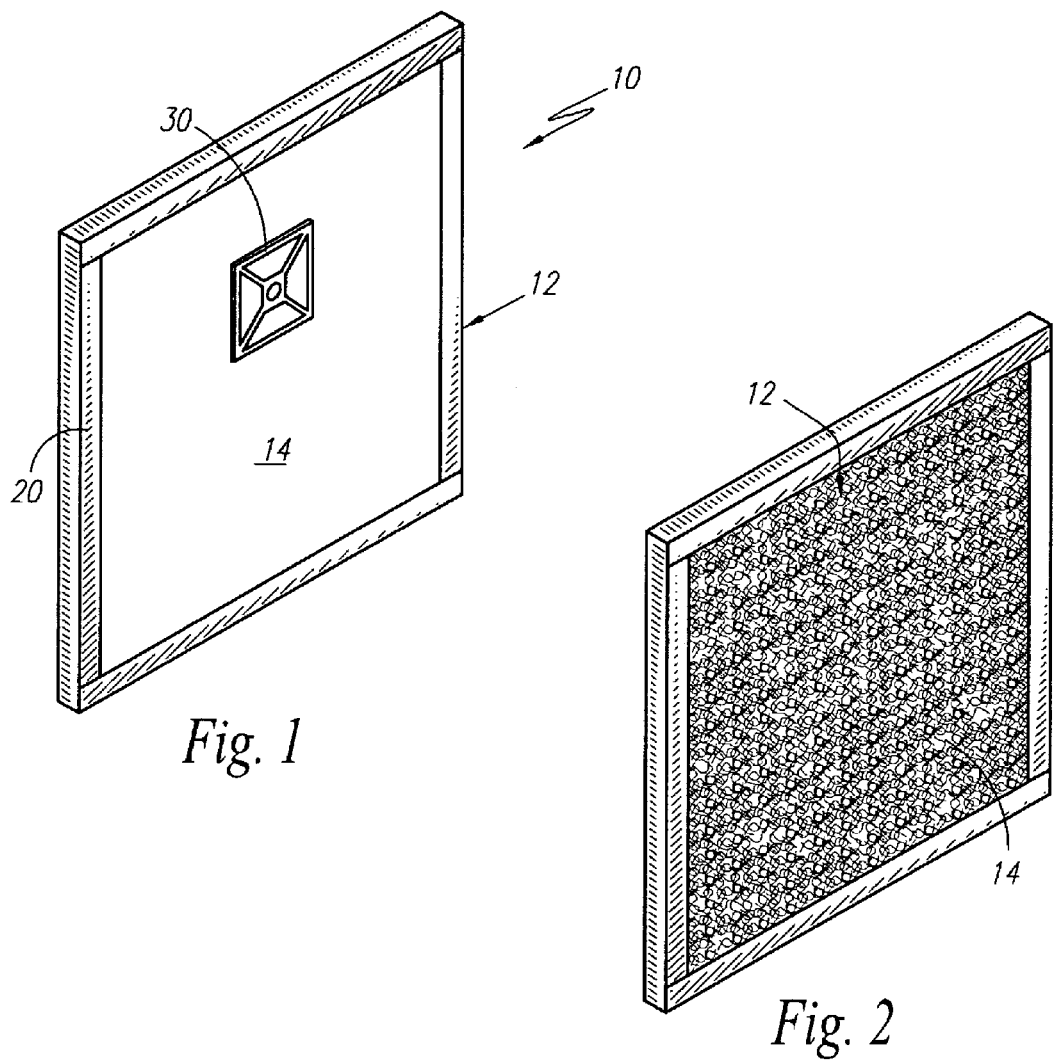
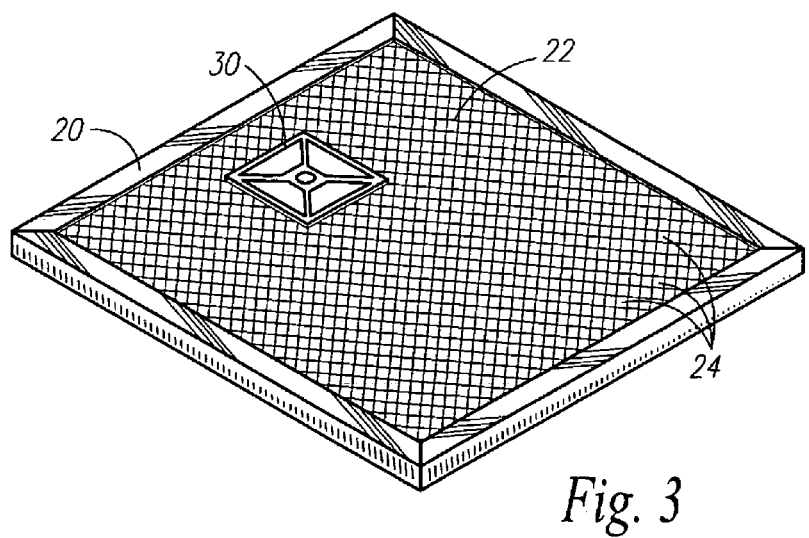

FILTER WITH CHANGE INDICATOR

RELATED APPLICATIONS

The present invention was first described in Disclosure No. 602,642 filed on Jun. 23, 2006 under 35 U.S.C. §122, 37 C.F.R. §1.14, and MPEP §1706. There are no previously filed, nor currently any co-pending applications, anywhere in the world.

BACKGROUND OF THE INVENTION

1. Field of the Invention

The present invention relates generally to filters and, more particularly, to a filter having a change indicator and fragrance emitter.

2. Description of the Related Art

Disposable-type air filters have been commercially available for many years. These filters have been made generally for use in heating, ventilation, and air-conditioning systems to provide protection against particulate contaminants such as lint, dust, smoke, pollen, and dander.

The prior art discloses numerous signaling devices for air filters. However, the prior art fails to disclose a reusable fragrance and auditory emission apparatus adapted to be installed on disposable-type air filters.

Accordingly, a need has arisen for a fragrance and auditory emission apparatus adapted for installation in disposable type air filters in a manner which is quick, easy, and efficient.

A search of the prior art did not disclose any patents that read directly on the claims of the instant invention; however, the following references were considered related.

The following patents disclose various air filters with indicators for alerting when the filter is dirty or clogged, thereby requiring replacement or cleaning:

U.S. Pat. No. 6,110,260, issued in the name of Kubokawa;
U.S. Pat. No. 5,352,255, issued in the name of Taft;
U.S. Pat. No. 2,753,831, issued in the name of Davies;
U.S. Pat. No. 4,321,070, issued in the name of Bede;
U.S. Pat. No. 1,770,094, issued in the name of Wickersham;
U.S. Pat. No. 3,740,931, issued in the name of Nowicki;
U.S. Pat. No. 6,412,435 B1, issued in the name of Timmons, Jr.; and
U.S. Pat. No. 6,320,513 B1, issued in the name of Timmons, Jr.

U.S. Pat. No. 6,096,224, issued in the name of Champie discloses a filter alert having a pressure differential switch that is responsive to positive and/or negative pressure through a pressure tube.

U.S. Pat. No. 5,325,809, issued in the name of Mulle, Jr. discloses a warning system for a hair dryer to warn the user when the air inlet of the dryer has become clogged with hair or other particles.

U.S. Pat. No. 6,913,733 B2, issued in the name of Hardy et al. discloses a system for deodorizing air an/or emitting one or more substances into the air.

U.S. Pat. No. 6,837,922 B2, issued in the name of Gorin discloses an air filter sensor kit and method of using the same for permitting a person to modify the filtering portion of a heating or cooling system that uses an air filter to enable the determination of when the air filter is dirty and needs changing.

Consequently, a need has been felt for a fragrance and auditory emission apparatus adapted to be installed in disposable type air filters in a manner which is quick, easy, and efficient.

SUMMARY OF THE INVENTION

Therefore, it is an object of the present invention to provide a filter with a change indicator.

It is another object of the present invention to provide a filter with a means for emitting a fragrance.

It is another object of the present invention to provide a fragrance and auditory emission apparatus adapted to be installed in disposable type air filters which are adapted to remove contaminants carried along in the air stream of heating, ventilation, and air-conditioning (HVAC) systems.

It is another object of the present invention to provide a fragrance and auditory emission apparatus that is reusable.

It is another object of the present invention to provide a fragrance and auditory emission apparatus which includes a fragrance media adapted to emit a pleasant scent, thereby functioning as an air freshener.

It is another object of the present invention to provide a fragrance and auditory emission apparatus adapted to accommodate replacement fragrance media.

It is another object of the present invention to provide a fragrance and auditory emission apparatus which functions as a room deodorizer.

It is another object of the present invention to provide an audible signaling device which is adapted to emit a shrill tone or whistling noise when the filter becomes dirty or clogged.

Briefly described according to one embodiment of the present invention, a filter with change indicator is disclosed and comprises an air filter defined as a viscous, disposable type air filter. The air filter is adapted to remove various particulate contaminants from air streams such as lint, dust, smoke, pollen, and dander. The filter with change indicator is specifically adapted to remove contaminants carried along in the air stream of heating, ventilation, and air-conditioning (HVAC) systems. Air filter includes a filter medium supported by a surrounding frame to which the periphery of the filter medium is secured.

The filter with change indicator 10 further comprises a fragrance and auditory emission apparatus comprised of a fragrance media supported by a surrounding frame to which a periphery of the fragrance media is secured. The frame defines a first planar surface, a second planar surface, and an integral lattice underwhich fragrance media is contained. The first planar surface includes a plurality of open sections which are divided by support members which form lattice. The second planar surface is disposed with an attachment means. The attachment means functions to removably attach fragrance media to second planar surface.

The support members are joined by a bridge coupled therebetween about a linearly-elongated centerline of surrounding frame. The bridge has a bore formed centrally therethrough within which is inserted an audible signaling device adapted to emit an auditory impression or signal when the negative pressure drop across the filter increases to a predetermined value, thereby indicating a dirty or clogged filter.

The fragrance media is defined as a fibrous sheet material impregnated or coated with a fragrance agent. The fibrous sheet material is adapted to steadfastly adhere to the second planar surface via a suitable attachment means. The fibrous sheet material includes a centered aperture so as to allow passage of the audible signaling device therethrough. The fibrous sheet material is impregnated or coated with a fragrance agent so as to emit a pleasant scent and function as an air freshener. Fragrance agent may be selected from a variety of fragrances, scent substances and compositions. Alternatively, fibrous sheet material may be impregnated or coated with a deodorizing agent so as to remove malodors from the air.

The audible signaling device is adapted to emit a shrill tone or whistling noise when the filter becomes inefficient such as when the filter becomes excessively obstructed with particulates. The audible signaling device is defined as having an elongated tubular body which includes an upper, circular hollow flange mounted thereto on an upstream end. The tubular body is envisioned as being available in a variety of lengths so as to accommodate filters of varied thicknesses. The flange includes upper and lower sidewalls and axially spaced apart sidewalls so as to form a resonating chamber. The tubular body has a restricted longitudinal cavity which decreases in diameter. A distal end of tubular body tapers substantially into an annular projection in such a manner so as to form a bougie. The bougie portion of tubular body is adapted to be inserted through bore of bridge and penetrate or pierce the filter medium of filter completely therethrough from the upstream end thereof. Once inserted through filter, a fastener is connected to the end of tubular body portion, thereby securing fragrance and auditory emission apparatus to filter.

The fragrance and auditory emission apparatus is adapted to be reusable.

The use of the present invention allows a user to be notified audibly when a filter needs changing in a manner which is quick, easy, and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a perspective view of the filter with change indicator, according to the preferred embodiment of the present invention;

FIG. 2 is a perspective view of a disposable type air filter for use in HVAC systems;

FIG. 3 is a perspective view of a disposable type air filter with lattice;

DESCRIPTION OF THE PREFERRED EMBODIMENT

1. Detailed Description of the Figures

Figure 4:
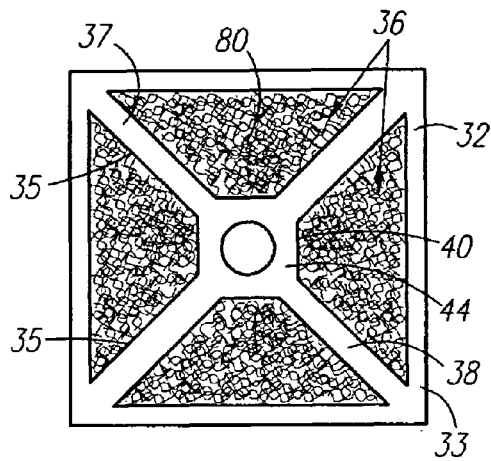
FIG. 4 is a top plan view of the surrounding frame of the fragrance and auditory emission apparatus shown supporting a fragrance media, according to the preferred embodiment of the present invention.
Figure 5:
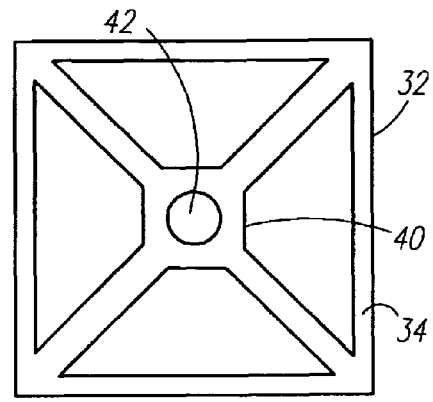
FIG. 5 is a bottom plan view of the surrounding frame of the fragrance and auditory emission apparatus shown without fragrance media.
Figure 6:
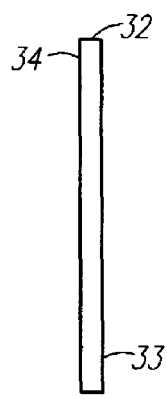
FIG. 6 is a right side view of the surrounding frame of the fragrance and auditory emission apparatus.
Figure 7:
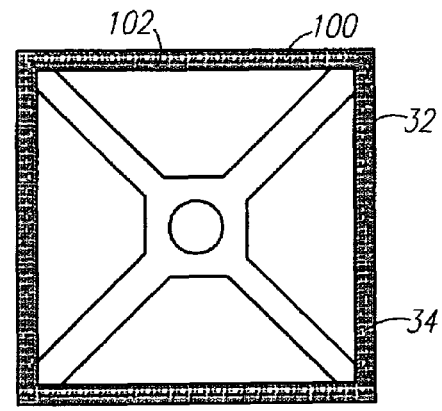
FIG. 7 is a bottom plan view of the second planar surface of the surrounding frame shown disposed with an attachment means, according to the preferred embodiment of the present invention.
Figure 8:
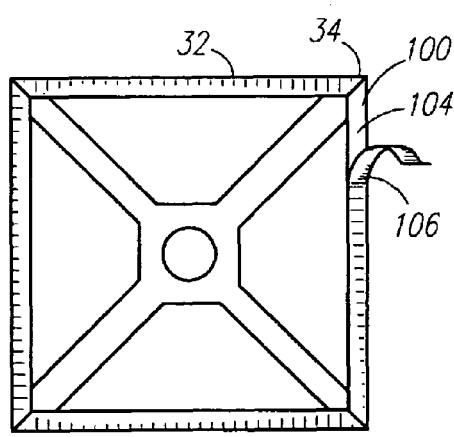
FIG. 8 is a bottom plan view of the second planar surface of the surrounding frame shown disposed with an alternative attachment means.
Figure 9:
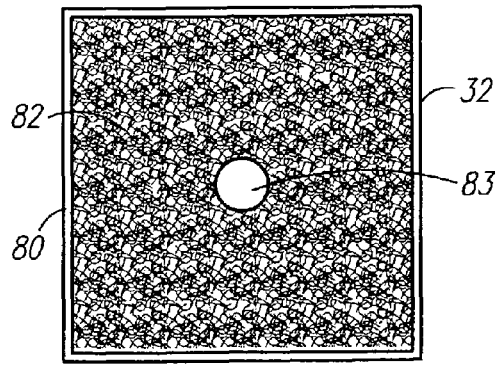
FIG. 9 is rear side view of the fibrous sheet material shown attached to the surrounding frame, according to the preferred embodiment of the present invention.
Figure 10:
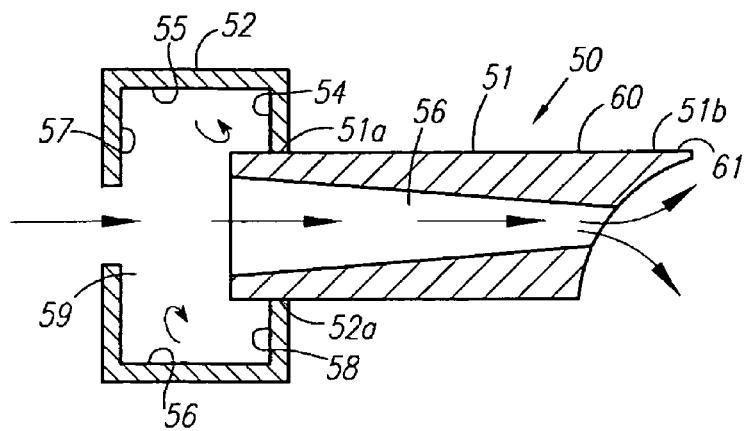
FIG. 10 is a cross-sectional view of the audible signaling device, according to the preferred embodiment of the present invention.
Figure 11:
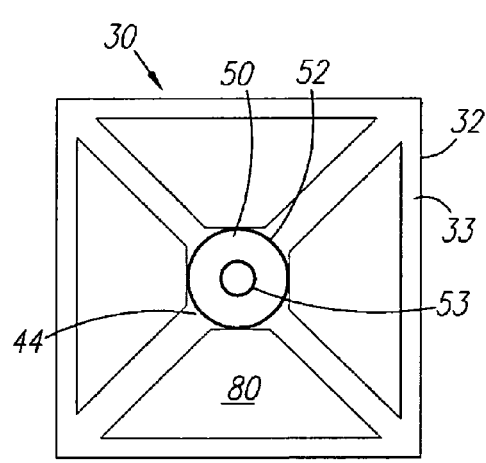
FIG. 11 is a front side elevational view of the surrounding frame of the fragrance and auditory emission apparatus illustrating the audible signaling device having been inserted therethrough, according to the preferred embodiment of the present invention.
Figure 12:
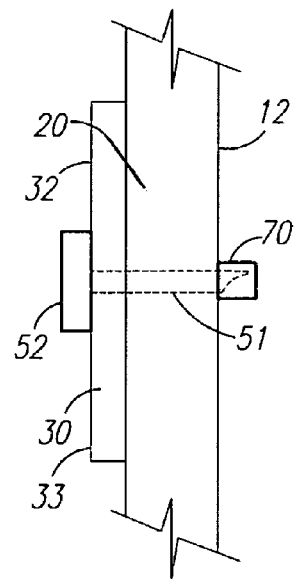
FIG. 12 illustrates a partial left side elevational view of the fragrance and auditory emission apparatus shown attached to the upstream end of a filter.
Figure 13:
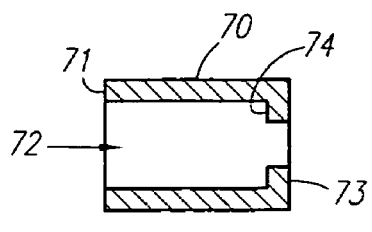
FIG. 13 illustrates a cross-sectional view of the fastener.

Referring now to FIGS. 1-3, a filter with change indicator 10 is shown, according to the present invention, comprised of an air filter 12 defined as a viscous, disposable type air filter 12. The air filter 12 is adapted to remove various particulate contaminants from air streams. Particulate contaminants include lint, dust, smoke, pollen, and dander. The filter with change indicator 10 is specifically adapted to remove contaminants carried along in the air stream of heating, ventilation, and air-conditioning (HVAC) systems. For purposes of the present invention, filter 12 may also be a permanent type air filter or a filter for use with a gaseous stream having particulate contaminants.

Air filter 12 includes a filter medium 14 supported by a surrounding frame 20 to which the periphery of the filter medium 14 is secured via a suitable adhesive or attachment means. The frame 20 is constructed of a suitable material which includes metal, plastic, rigid polymeric material, pasteboard, or cardboard. The frame 20 may include integral lattice 22 with openings 24, wherein lattice 22 is provided on at least one side of the filter medium 14. In an embodiment defining integral lattice 22 on both sides of filter medium 14, filter medium 14 is contained between the integral lattice 22.

The filter medium 14 is constructed of a material suitable for filtering particulate contaminants which includes but is not limited to fiberglass, cotton/polyester blends, blown microfibers, spunbonded nonwoven polymeric webs, reticulated foam, expanded foam, and polyester fiber received within sheets of polypropylene.

Referring now to FIGS. 4-9, the filter with change indicator 10 further comprises a fragrance and auditory emission apparatus 30 comprised of a fragrance media 80 supported by a surrounding frame 32 to which a periphery of the fragrance media 80 is secured. The fragrance and auditory emission apparatus 30 is envisioned to be fabricated of materials which include but are not limited to textiles, paper, cardboard, plastic, plastic polymers, lightweight metal, and wood. The frame 32 defines a first planar surface 33, a second planar surface 34, and an integral lattice 35 underwhich fragrance media 80 is contained. The first planar surface 33 of frame 32 includes a plurality of open sections 36 which are divided by support members 37, 38 which form lattice 35. The second planar surface 34 is disposed with an attachment means 100. The attachment means 100 includes a hook portion 102 of a hook-and-loop fastener, an adhesive carrier 104, or any other suitable means for removably attaching fragrance media 80 to second planar surface 34. However, the hook portion 102 is the preferable attachment means 100.

The hook portion 102 facilitates steadfast adherence by fragrance media 80 to second planar surface 34 of surrounding frame 32. The hook portion 102 further allows for the fragrance media 80 to be replaced with a fresh or new fragrance media 80 as desired or when user feels necessary.

The adhesive carrier 104 is a double-sided, adhesive-coated film. The adhesive carrier 104 is adapted to facilitate adherence by fragrance media 80 thereto. The adhesive carrier 104 is covered by a releasable liner 106.

The support members 37, 38 are each illustrated herein as having a V-shaped configuration. Support members 37, 38 are joined by a bridge 40 disposed therebetween about a linearly-elongated centerline of surrounding frame 32. Bridge 40 is integrally molded with support members 37, 38 during the fabrication process, or bridge 40 may be suitably coupled to support members 37, 38 via a suitable coupling means or permanent adhesive. Bridge 40 has a bore 42 formed centrally therethrough within which is inserted an audible signaling device 50 (to be described later in greater detail) adapted to emit an auditory impression or signal when the negative pressure drop across the filter 12 increases to a predetermined value, thereby indicating a dirty or clogged filter.

The fragrance media 80 is defined as a fibrous sheet material 82 impregnated or coated with a fragrance agent. The fibrous sheet material 82 is defined as a fabric material adapted to steadfastly adhere to the hook portion 102 of a hook-and-loop fastener such as Velcro™ or a suitable adhesive carrier 104. The fibrous sheet material 82 includes a centered aperture 83 so as to allow passage of audible signaling device 50 therethrough. The fibrous sheet material 82 is impregnated or coated with a fragrance agent so as to emit a pleasant scent and function as an air freshener. Fragrance agent may be selected from a variety of fragrances, scent substances and compositions, or substances that act to condition, modify, or otherwise charge the atmosphere or modify the environment, thereby providing a broad selection of fragrances capable of being selected by user and according to user preference.

The fibrous sheet material 82 may alternatively be impregnated or coated with a deodorizing agent so as to remove malodors from the air. Deodorizing agents include but are not limited to cyclodextrin, silicates, alumina, carbonates, activated carbon, sodium bicarbonate, zeolites, natural saponins such as *Yucca Schidigera* and *Yucca Scutigera*, and other known odor removing substances and combinations thereof.

Referring now more specifically to FIGS. 10-13, the audible signaling device 50 is adapted to emit a shrill tone or whistling noise when the filter 12 becomes inefficient such as when filter 12 becomes excessively obstructed with particulates. Thus, the audible signaling device 50 may comprise various embodiments and design configurations which include wind instrument devices in which sound is produced by the forcible passage of air through a cavity and/or against a thin edge or bevel of a sound hole. For purposes of this disclosure, the audible signaling device 50 is defined as having an elongated tubular body 51 which includes an upper, circular hollow flange 52 mounted thereto on an upstream end. The tubular body 51 is envisioned as being available in a variety of lengths so as to accommodate filters 12 of varied thicknesses. The flange 52 has a centered aperture 53 on a top portion and a centered aperture 54 at a bottom portion thereof. The flange 52 includes upper and lower sidewalls 55, 56 and axially spaced apart sidewalls 57, 58 so as to form a resonating chamber 59. The tubular body 51 has a restricted longitudinal cavity 56 extending from a proximal end 51*a* to a distal end 51*b* thereof, wherein cavity 56 decreases in diameter approaching the distal end 51*b*. The distal end 51*b* of tubular body 51 tapers substantially into an annular projection 60 in such a manner so as to form a bougie 61. The bougie 61 portion of tubular body 51 is adapted to be inserted through bore 42 of bridge 40 and penetrate or pierce the filter medium 14 of filter 12 completely therethrough from the upstream end thereof in a manner such that a lower recess 52*a* of flange 52 abuts snugly against a frontal surface 44 of bridge 40 and the bougie 61 portion projects from the downstream end of filter 12. Once inserted through filter 12, a fastener 70 is connected to the bougie 61 portion, wherein fastener 70 functions to removably secure fragrance and auditory emission apparatus 30 to filter 12.

The fastener 70 defines an elongated, cylindrical configuration having a centered hole 72 formed therethrough, wherein centered hole 72 has a diametric measure adapted to dimensionally accommodate an outer circumferential surface of the distal end 51*b* of tubular body 51. The fastener 70 is held onto bougie 61 portion via mechanical interference or frictional fit. The fastener 70 is envisioned to include a circular seat or flange 74 molded integral with an inner circumferential wall of fastener 70 at a rearward end 73 thereof. The seat 74 extends upwardly towards a frontal end 71 of fastener 70. The seat 74 functions as a stop or obstructive element to impede bougie 61 portion from extending past fastener 70 when fastener 70 is secured to bougie 61. As fastener 70 is secured onto bougie 61 portion, the bougie 61 portion engages and contacts seat 74, thereby preventing further movement by fastener 70, and in turn preventing accidental puncture or harm to user. As described earlier, fastener 70 also functions to removably secure fragrance and auditory emission apparatus 30 to filter 12. Other fastener 70 embodiments are envisioned and include a fastener having male threads adapted to mate with female threads of bougie 61, and a rubber or plastic washer.

Figure 14:
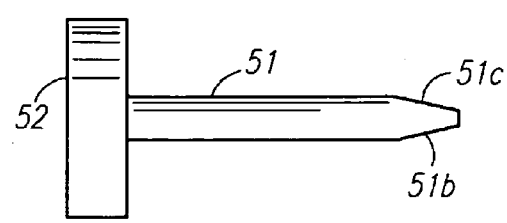
FIG. 14 illustrates an alternate embodiment of the audible signaling device.

Referring now to FIG. 14, a further embodiment of the audible signaling device 50 is disclosed wherein distal end 51*b* of tubular body 51 tapers moderately into a tip 51*c*. The tip 51*c* facilitates insertion by tubular body 51 through the filter medium 14 of filter 12. A fastener 70 is connected to tip 51*c* so as to removably secure fragrance and auditory emission apparatus 30 to filter 12.

The fragrance and auditory emission apparatus 30 is adapted to be installed in filters 12 comprised of various thicknesses. In addition, the fragrance and auditory emission apparatus 30 is adapted to be positioned on and installed in filters 12 so as to extend through filter medium 14. The fragrance and auditory emission apparatus 30 is positioned on filter 12 in a location which avoids a location susceptible to interference by the housing of an HVAC system, but apparatus 30 may otherwise be positioned in any location on filter medium 14 of filter 12 according to user preference.

Importantly, the fragrance and auditory emission apparatus 30 is adapted to be reusable. Thus, upon indication by apparatus 30 via a whistling sound that filter 20 is dirty or clogged, user removes dirty filter 12, removes the fragrance and auditory emission apparatus 30 therefrom, replaces used fragrance media 80 with a fresh fragrance media 80, installs apparatus 30 in clean filter 12, and installs clean filter 12 with attached apparatus 30 in the proper HVAC system location.

2. Operation of the Preferred Embodiment

To use the present invention, user inserts the distal end 51*b* of tubular body 51 through the bore 42 of bridge 40 of the surrounding frame 32 of auditory emission apparatus 30, and penetrates or pierces the filter medium 14 of filter 12 completely therethrough from the upstream end thereof in a manner such that a lower recess 52*a* of flange 52 abuts snugly against a frontal surface 44 of bridge 40 and the distal end 51*b* of tubular body 51 projects from the downstream end of filter 12. Next, user adheres the fragrance media 80 to the second planar surface 34 of the surrounding frame 32 of the auditory emission apparatus 30, while carefully guiding the bougie 61 portion of tubular body 51 through the centered aperture 83 of fragrance media 80. User then secures fastener 70 onto bougie 61 portion, thereby removably securing fragrance and auditory emission apparatus 30 to filter 12. Finally, user installs the filter with change indicator 10 in a proper HVAC system location.

The use of the present invention allows user to be notified when an air filter needs to be changed in a manner which is quick, easy, and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A fragrance and auditory emission apparatus comprising:
a fragrance media, said fragrance media is supported by a surrounding frame to which a periphery of said fragrance media is secure; and
an audible signaling device, said audible signaling device is inserted through and retained by said surrounding frame, said surrounding frame defines a first planar surface, a second planar surface, and an integral lattice under which said fragrance media is contained, said first planar surface of said surrounding frame includes a plurality of open sections divided by support members forming said lattice, said support members are each defined as having a V-shaped configuration, said support members are joined by a bridge disposed therebetween about a linearly-elongated centerline of said surrounding frame, wherein said bridge has a bore formed centrally therethrough, wherein said bore is inserted with said audible signaling device, said audible signaling device emits an auditory impression or signal when negative pressure drop across an air filter increases to a predetermined value, thereby indicating a dirty or clogged air filter, said audible signaling device comprises an elongated tubular body which includes an upper, circular hollow flange mounted thereto on an upstream end, said flange has a centered aperture on a top portion and a centered aperture at a bottom portion thereof, wherein said flange includes upper and lower sidewalls and axially spaced apart sidewalls so as to form a resonating chamber, said tubular body has a restricted longitudinal cavity extending from a proximal end to a distal end thereof, wherein said cavity decreases in diameter approaching said distal end, said distal end of said tubular body tapers substantially into an annular projection so as to form a bougie, wherein said bougie is inserted through said bore of said bridge and penetrates a filter medium of the air filter, wherein said audible signaling device further comprises a fastener, said fastener is connected to said bougie so as to removably secure said fragrance and auditory emission apparatus to the air filter, said audible signaling device emits a shrill tone or whistling noise when the air filter becomes inefficient or when the air filter becomes excessively obstructed with particulates, and wherein said fastener defines an elongated, cylindrical configuration having a centered hole formed therethrough, wherein said centered hole has a diametric measure dimensionally accommodating an outer circumferential surface of said distal end of said tubular body, said fastener is held onto said bougie via mechanical interference, said fastener includes a circular flange molded integral with an inner circumferential wall of said fastener at a rearward end thereof, said circular flange extends upwardly towards a frontal end of said fastener, said circular flange functions as a stop to impede said bougie from extending past said fastener when said fastener is secured to said bougie.

2. The fragrance and auditory emission apparatus of claim 1, wherein said second planar surface is disposed with an attachment means for removably attaching said fragrance media to said second planar surface.

3. The fragrance and auditory emission apparatus of claim 2, wherein said fragrance media is defined as a fibrous sheet material impregnated or coated with a fragrance agent so as to emit a pleasant scent and function as an air freshener.

4. The fragrance and auditory emission apparatus of claim 3, wherein said fibrous sheet material is defined as a fabric material adapted to steadfastly adhere to said attachment means, said fibrous sheet material includes a centered aperture allowing passage of said audible signaling device therethrough.

5. The fragrance and auditory emission apparatus of claim 3, wherein said fragrance agent is selected from a variety of fragrances, scent substances and compositions, or substances that otherwise act to condition, modify, or otherwise charge the atmosphere or modify the environment, thereby providing a broad selection of fragrances capable of being selected by user and according to user preference.

6. The fragrance and auditory emission apparatus of claim 2, wherein said fragrance media is defined as a fibrous sheet material impregnated or coated with a deodorizing agent so as to remove malodors from the air.

7. The fragrance and auditory emission apparatus of claim 6, wherein said deodorizing agent is selected from the group consisting of cyclodextrin, silicates, alumina, carbonates, activated carbon, sodium bicarbonate, zeolites, natural saponins, and other odor removing substances and combinations thereof.

8. The fragrance and auditory emission apparatus of claim 1, wherein said bridge is integrally molded with said support members during fabrication process.

9. The fragrance and auditory emission apparatus of claim 1, wherein said bridge is suitably coupled to said support members via a suitable coupling means or permanent adhesive.

10. The fragrance and auditory emission apparatus of claim 1, wherein said audible signaling device comprises an elongated tubular body which includes an upper, circular hollow flange mounted thereto on an upstream end, said flange has a centered aperture on a top portion and a centered aperture at a bottom portion thereof, wherein said flange includes upper and lower sidewalls and axially spaced apart sidewalls so as to form a resonating chamber, said tubular body has a restricted longitudinal cavity extending from a proximal end to a distal end thereof, wherein said cavity decreases in diameter approaching said distal end.

11. The fragrance and auditory emission apparatus of claim 10, wherein said distal end of said tubular body tapers substantially into an annular projection in such a manner so as to form a bougie, said bougie is inserted through said bore of said bridge and penetrates or pierces a filter medium of the air filter completely therethrough from the upstream end thereof in a manner such that a lower recess of said flange abuts snugly against a frontal surface of said bridge and said bougie projects from the downstream end of the air filter.

12. The fragrance and auditory emission apparatus of claim 10, wherein said audible signaling device further comprises a fastener, said fastener is connected to said bougie, thereby removably securing said fragrance and auditory emission apparatus to the air filter, and wherein said audible signaling device emits a shrill tone or whistling noise when the air filter becomes inefficient or when the air filter becomes excessively obstructed with particulates.

* * * * *